United States Patent [19]

Koltookian

[11] Patent Number: 5,221,118
[45] Date of Patent: Jun. 22, 1993

[54] PART GRIPPING UNIT

[75] Inventor: Sarkis A. Koltookian, Cedar Falls, Iowa

[73] Assignee: Deere & Company, Moline, Ill.

[21] Appl. No.: 860,955

[22] Filed: Mar. 31, 1992

[51] Int. Cl.$^5$ .................. B25J 15/00; B25J 17/02
[52] U.S. Cl. ........................ 294/86.41; 294/119.4;
414/729; 414/735; 901/29; 901/30
[58] Field of Search ............. 294/67.21, 67.5, 68.26,
294/68.27, 81.3, 81.4, 86.4, 86.41, 88, 103.2,
113, 119.4; 414/729, 732, 735, 738, 743, 772,
776, 783; 901/29-31, 39

[56] References Cited

U.S. PATENT DOCUMENTS

| | | | |
|---|---|---|---|
| 2,630,931 | 3/1953 | Douglas | 294/86.41 X |
| 3,301,587 | 1/1967 | Heikkinen | 294/119.4 X |
| 4,099,762 | 7/1978 | Hultdin et al. | 414/729 X |
| 4,229,136 | 10/1980 | Panissidi | 901/29 X |
| 4,451,198 | 5/1984 | Sanderson | 294/86.41 X |
| 4,636,134 | 1/1987 | Tellden | 414/729 |
| 5,157,823 | 10/1992 | Delaval et al. | 414/743 X |

FOREIGN PATENT DOCUMENTS

| | | | |
|---|---|---|---|
| 3207139 | 9/1983 | Fed. Rep. of Germany | 294/67.5 |
| 271869 | 9/1989 | German Democratic Rep. | 294/86.41 |
| 868772 | 5/1961 | United Kingdom | 294/86.41 |

OTHER PUBLICATIONS

Swedish Machine Group, "ERGOLIFT New Generation", Brochure, date unknown.

Primary Examiner—Jonny D. Cherry

[57] ABSTRACT

A gripping unit includes a generally U-shaped frame fixed to a shaft which is rotatably connected to a manipulator arm. The actuator frame has a pair of spaced apart actuator arms. A generally U-shaped payload frame has a bracket member for attaching to a payload and a pair of payload arms extending from opposite ends of the bracket member. Each payload arm is pivotally coupled to a corresponding one of the actuator arms so that the payload frame is pivotal with respect to the actuator frame about an axis which is perpendicular to the axis of the shaft. A cam mechanism is operable to releasably hold the payload frame in certain orientations. A brake device prevents rotation of the actuator frame about the axis of the shaft.

13 Claims, 2 Drawing Sheets

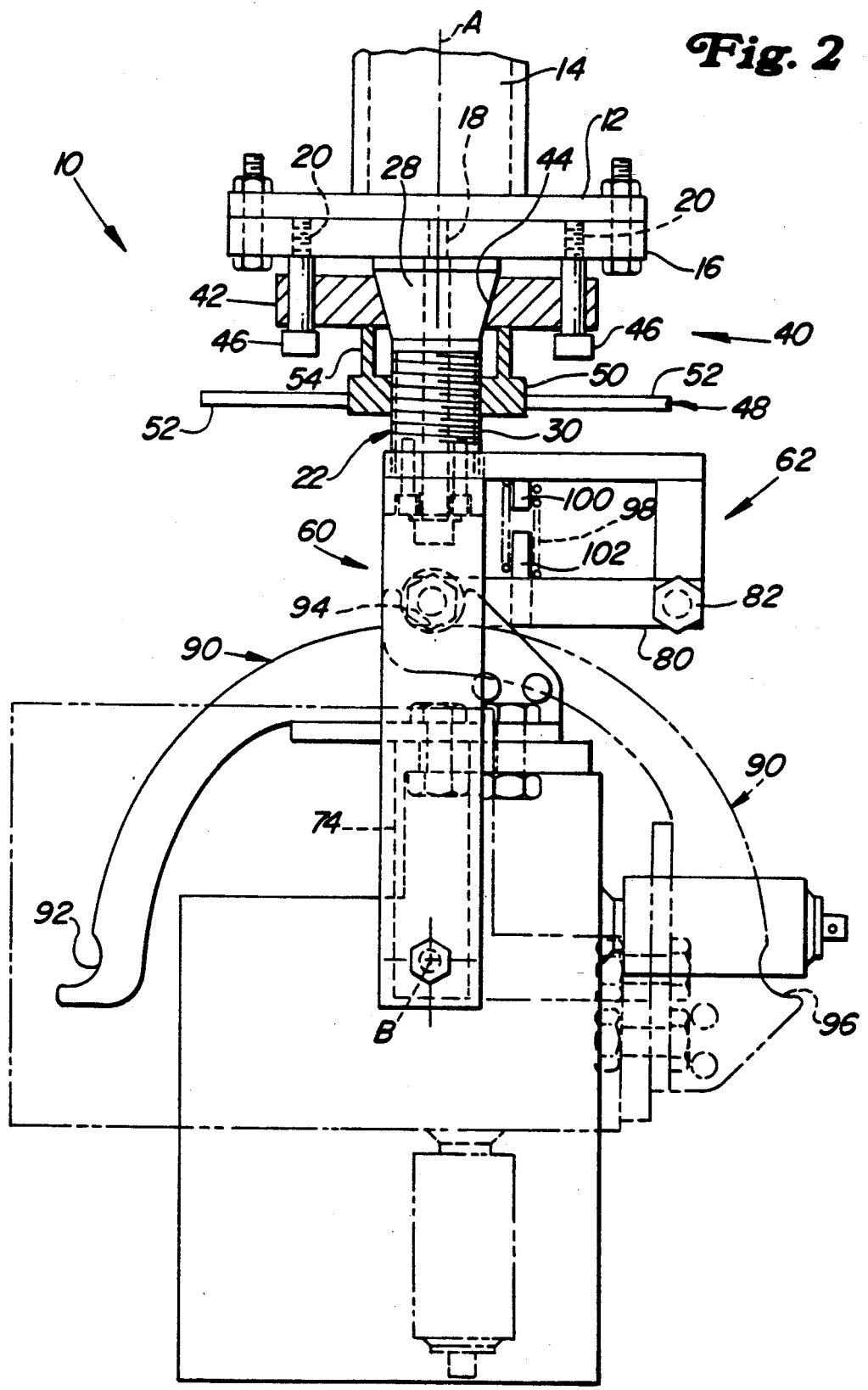

PART GRIPPING UNIT

BACKGROUND OF THE INVENTION

This invention relates to a part gripping unit for mounting at the end of a part manipulator such as a robot arm.

An actuator or gripping unit is typically mounted on the end of a manipulator, such as a robot arm, in order to provide the final degrees of freedom for motion of the part or payload being suspended. To achieve flexibility of part mounting in different applications, such gripping units typically have large bearings and offset mountings, and are therefore heavy and expensive.

SUMMARY OF THE INVENTION

An object of the present invention is to provide a gripping unit which mounts the payload near its center of gravity.

Another object of the invention is to provide a gripping unit which is compact, light weight and which makes use of minimally sized bearings.

These and other objects are achieved by the present invention wherein a gripping unit includes a shaft coupled to the arm for rotation about a first axis. A generally U-shaped actuator frame is fixed to the shaft and has a pair of spaced apart actuator arms. A generally U-shaped payload frame has a part support member for attaching to the part to be supported and a pair of payload arms extending from opposite ends of the bracket member. Each payload arm is pivotally coupled to a corresponding one of the actuator arms so that the payload frame is pivotal with respect to the actuator frame about a second axis which is perpendicular to the first axis. A cam mechanism is operable to releasably hold the payload frame in certain orientations and provides an easy method for cam detent locating, if desired, about the second axis. The second axis and an extension of the first axis would extend through the part attached to the part support member so that the part is effectively mounted near its center of gravity. This allows the use of minimal bearings and provides easy movement of the part. A coaxial cone brake on the shaft controls rotation about the first axis.

BRIEF DESCRIPTION OF THE DRAWINGS

FIG. 2 is a view along line 2—2 of FIG. 1, with some parts shown in cross section for purposes of clarity.

DETAILED DESCRIPTION

Figure 1:
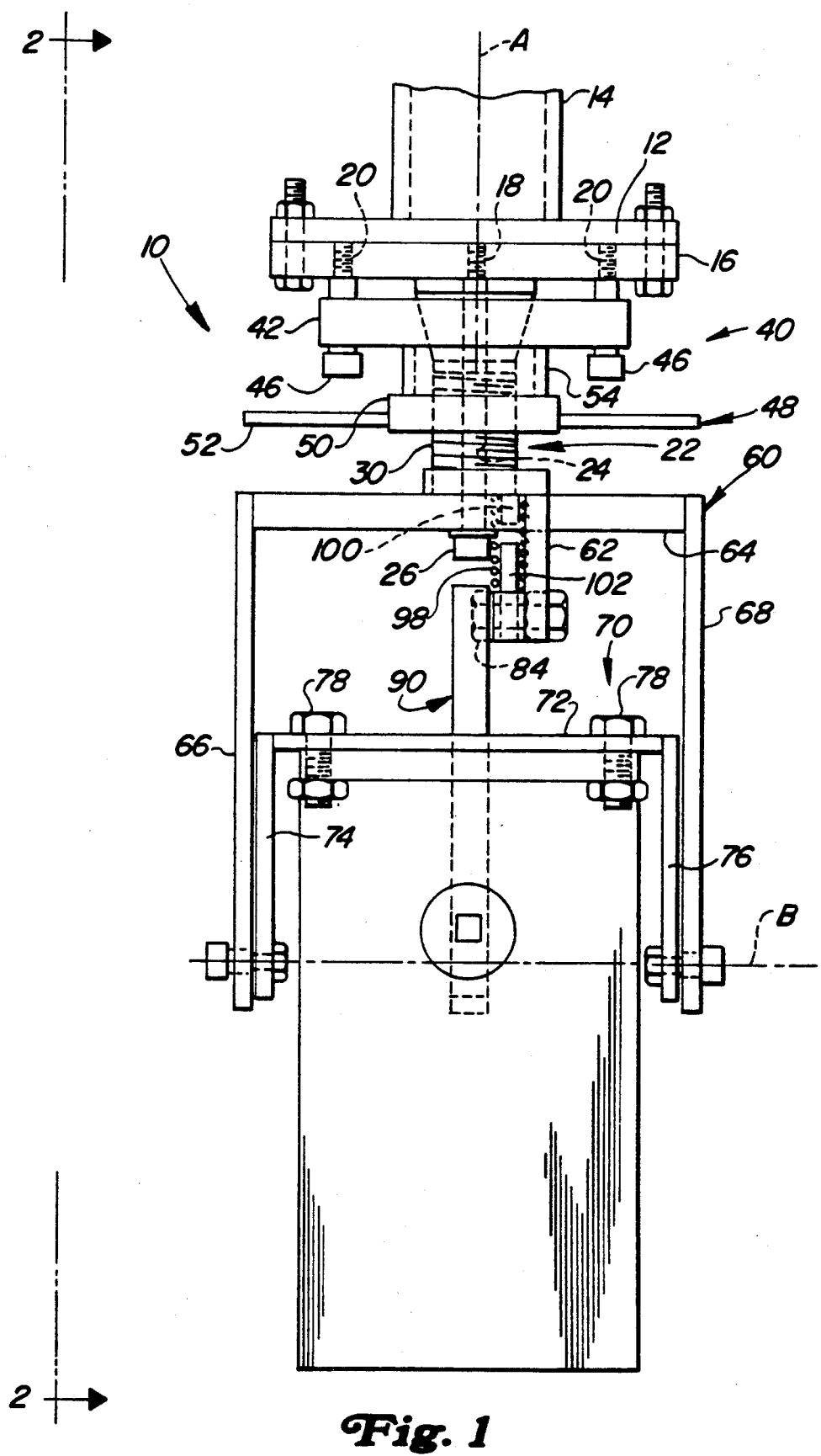
FIG. 1 is a side view of a part gripping unit according to the present invention.

The gripping unit 10 includes a plate 12 which is fixed (such as by welding) to an end of an arm 14 of a part manipulator (not shown). A mounting plate 16 is bolted to plate 12 and includes a central threaded bore 18 and a plurality of threaded bores 20 spaced apart and surrounding bore 18.

A shaft 22 has a central bore 24 extending therethrough and is rotatably coupled to the plate 16 by means of bolt 26, the end of which is threaded into bore 18. An axis A of shaft 22 defines a first axis about which the gripping unit 10 can rotate. The shaft 22 includes a frustoconical portion 28 and an externally threaded cylindrical portion 30. A pair of threaded bores 32 extend into the end of shaft 22 opposite plate 16.

A brake mechanism 40 is coaxially mounted on the shaft 22 and includes a brake plate 42 which has a central frustoconical aperture 44 which receives and engages the frustoconical portion 28 of shaft 22. The plate 42 is coupled to the plate 16 by bolts 46 for sliding movement parallel to the first axis. A brake collar 48 has a central hub 50 with a threaded opening which is threadably mounted on the threaded portion 30 of shaft 22. A plurality of spokes 52 project radially from the hub 50 and a hollow cylindrical part 54 projects axially from the hub 50 to an end which slidably engages the brake plate 42. The collar 48 is manually rotated and moved axially over the threaded portion 30 of shaft 22 to cause the brake plate 42 to frictionally engage the frustoconical portion 28 of shaft 22 and thereby releasably hold the shaft 22 and the gripping unit 10 in a desired position.

An actuator frame 60 and a detent frame 62 are fixed to the end of shaft 22, preferably by a pair of bolts which are received in threaded bores in the end of shaft 22. Both the actuator frame 60 and the detent frame 62 have bores which receive the shaft of bolt 26 so that frames 60 and 62 are free to rotate with shaft 22 about axis A. The generally U-shaped actuator frame 60 has a frame member 64 fixed to the shaft 22 and a pair of actuator arms 66, 68 extending from opposite ends of the frame member 64.

A generally U-shaped payload frame 70 has bracket 72 and a pair of payload arms 74, 76 which extend from opposite ends of the bracket 72. An end of each payload arm 74, 76 is pivotally coupled to an end of a corresponding one of the actuator arms 66, 68 so that the payload frame 70 is pivotal with respect to the actuator frame 60 about a second axis B which is perpendicular to axis A of shaft 22. The part to be held or payload P may be attached to the payload frame 70 by bolts 78.

The detent frame 62 is generally L-shaped and a detent arm 80 has one end which is pivotally coupled to the end of detent frame 62 by pivot pin 82. The other end of arm 80 carries a detent member 84. A curved cam member 90 is fixed to the bracket 72 of payload frame 70. Detent notches 92, 94 and 96 are formed in the cam member 90 at desired locations. A spring 98 is mounted on spring guides 100 and 102 and is biassed to urge the detent arm 80 and its detent member 84 into engagement with the cam member 90. The detent member 84 and the cam member 90 and its detent notches cooperate to releasably hold the payload frame 70 in certain orientations with respect to the actuator frame 60, making it easy to rotate the payload P about axis B. The cam member 90, the detent arm 80 and its detent member 84 are positioned between the frame member 64 of the actuator frame 60 and the bracket member 72 of the payload frame 70.

It can be seen that the second axis B and an extension of the first axis A extend through the payload P. As a result, the payload is held near its center of gravity. This allows the use of minimal bearings and provides easy movement throughout its range of travel. Further, the use of a coaxial cone brake on the vertical axis reduces the size and weight of the gripping unit.

This configuration results in a light weight, simple, and inexpensive gripping unit for suspending payloads from manipulator arms. The weight reduction is significant in that it may allow use of a more economical manipulator. The simplicity of this gripping unit configuration makes it practical to custom tailor it to payload with different sizes and shapes.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A gripping unit for a part manipulator having an arm, comprising:
   a first frame coupled to the arm for rotation about a first axis, the first frame having a pair of spaced apart parallel extending actuator arms;
   a second frame having a pair of spaced apart parallel extending payload arms, each payload arm being pivotally coupled to a corresponding one of the actuator arms so that the second frame is pivotal with respect to the first frame about a second axis which is perpendicular to the first axis;
   means for attaching a payload to the second frame between the payload arms;
   a detent mechanism for releasably holding the second frame in certain orientations with respect to the first frame; and
   a brake device for preventing rotation of the first frame about the first axis.

2. The gripping unit of claim 1, wherein:
   a shaft is coupled to the arm for rotation about the first axis; and
   the first frame is fixed to an end of the shaft.

3. The gripping unit of claim 2, wherein the brake device comprises:
   a cone shaped portion of the shaft;
   a brake plate having an aperture for receiving and mating with the cone shaped portion of the shaft; and
   means for moving the brake plate into and out of engagement with the cone shaped portion of the shaft.

4. The gripping unit of claim 3, wherein the means for moving the brake plate comprises:
   a threaded portion of the shaft; and
   a collar having a threaded aperture for receiving the threaded portion of the shaft and means for engaging the brake plate.

5. The gripping unit of claim 1, wherein the detent mechanism comprises:
   a cam member fixed to one of the first and second frames;
   a detent member fixed to the other of the first and second frames; and
   a resilient member biassed to urge the detent member into engagement with the cam member, the detent member and the cam member cooperating to releasably hold the second frame in certain orientations with respect to the first frame.

6. The gripping unit of claim 5, wherein:
   the cam member and the detent member are positioned generally between the first and second frames.

7. A gripping unit for a part manipulator having an arm, comprising:
   a shaft coupled to the arm for rotation about a first axis;
   a generally U-shaped actuator frame having a frame member fixed to the shaft and a pair of actuator arms extending from opposite ends of the frame member;
   a generally U-shaped payload frame for attaching to a part to be held, the payload frame having a pair of payload arms extending from opposite ends of a bracket member, each payload arm being pivotally coupled to a corresponding one of the actuator arms so that the payload frame is pivotal with respect to the actuator frame about a second axis which is perpendicular to the first axis;
   a cam member fixed to one of the actuator and payload frames;
   a detent member fixed to the other of the actuator and payload frames;
   a resilient member biassed to urge the detent member into engagement with the cam member, the detent member and the cam member cooperating to releasably hold the payload frame in certain orientations with respect to the actuator frame.

8. The gripping unit of claim 7, wherein:
   the second axis and an extension of the first axis extend through the part.

9. The gripping unit of claim 7, further comprising:
   a brake device for preventing rotation of the shaft with respect to the manipulator arm.

10. The gripping unit of claim 9, wherein the brake device comprises:
    a cone shaped portion of the shaft;
    a brake plate having an aperture for receiving and mating with the cone shaped portion of the shaft; and
    means for moving the brake plate into and out of engagement with the cone shaped portion of the shaft.

11. The gripping unit of claim 10, wherein the means for moving the brake plate comprises:
    a threaded portion of the shaft; and
    a collar having a threaded aperture for receiving the threaded portion of the shaft and means for engaging the brake plate.

12. The gripping unit of claim 7, wherein:
    the cam member and the detent member are positioned between the frame member of the actuator frame and the bracket member of the payload frame.

13. The gripping unit of claim 7, wherein:
    the cam member is fixed to the bracket member of the payload frame;
    a detent bracket is fixed to and projects from the frame member of the actuator frame; and
    a detent arm is pivotally coupled to the detent bracket, the resilient member being coupled between the detent arm and the detent bracket, and the detent member being carried on an end of the detent arm.

* * * * *